UNITED STATES PATENT OFFICE.

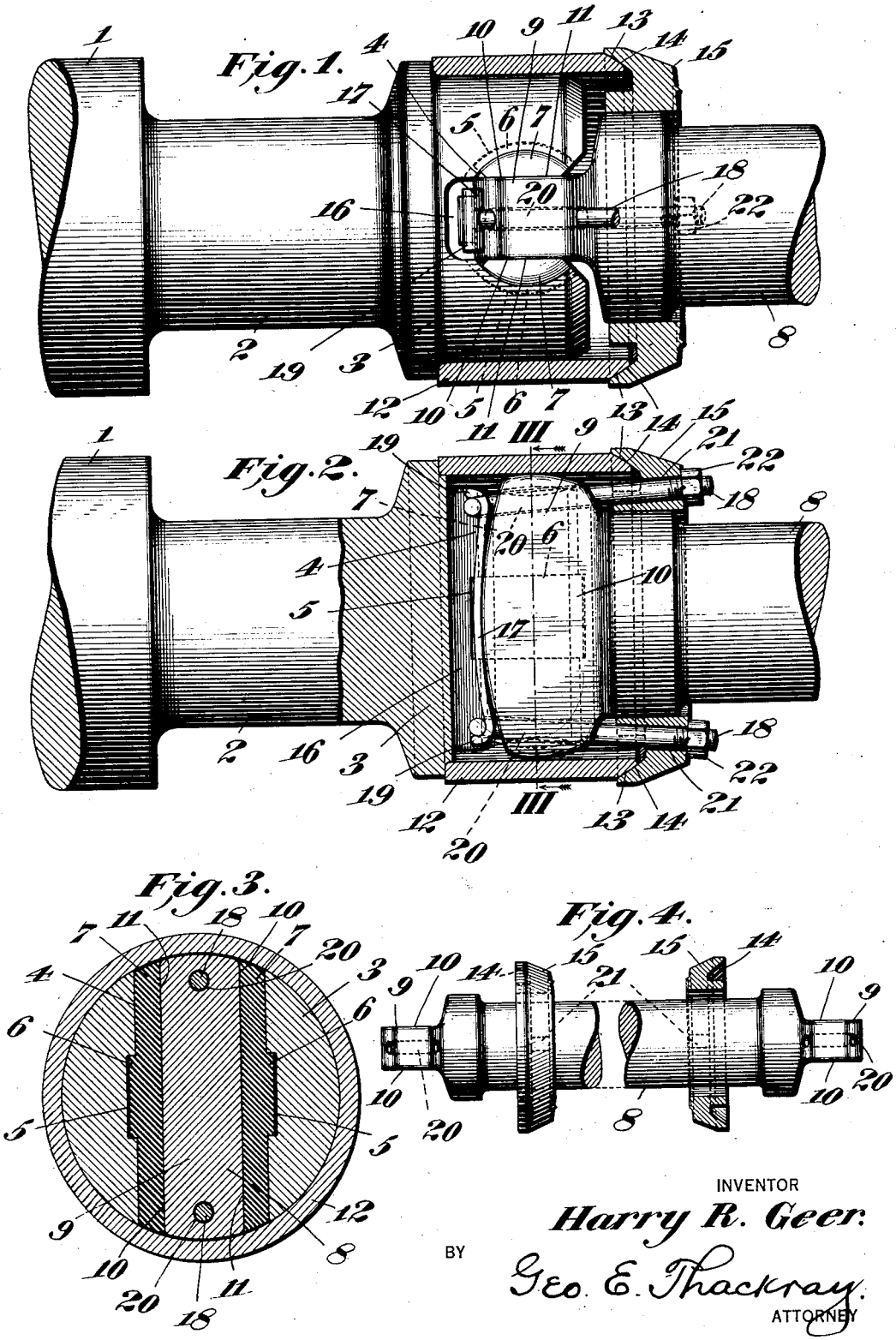

HARRY R. GEER, OF JOHNSTOWN, PENNSYLVANIA.

UNIVERSAL JOINT.

1,359,354.　　　　Specification of Letters Patent.　　Patented Nov. 16, 1920.

Application filed February 14, 1920. Serial No. 358,784.

*To all whom it may concern:*

Be it known that I, HARRY R. GEER, a citizen of the United States, and a resident of the city of Johnstown, county of Cambria, and State of Pennsylvania, have invented certain new and useful Improvements in Universal Joints; and I do hereby declare the following to be a full, clear, and exact description of the invention, such as will enable others skilled in the art to which it appertains to make and use the same.

My invention relates to improvements in universal joints for connecting shafts which are not always in alinement, such joints being particularly well adapted for use in rolling mills where provision for adjustment of the rolls and therefore considerable flexibility must exist. Furthermore it is essential to the life of the joint that some provision be made for good and sufficient lubrication of, and the exclusion of extraneous matter, dust, etc., from the wearing parts. It is also necessary in the adaptation of universal joints to rolling mills, particularly where reversal of the rolls takes place, that a minimum of lost motion and therefore a certain rigidity be inherent in the joint itself. Noiseless operation is also desirable.

Lack of following, or insufficient provision for, the above principles has heretofore made the application of universal joints to rolling mills a more or less questionable proposition, and I propose to remedy the matter by the attainment of the following objects:

First. To provide a universal joint which has great flexibility because of the oscillatory and translatory motion it can have when transmitting rotary motion from a driving shaft to a driven shaft.

Second. To provide a strong, durable, noiseless and economical universal joint of the necessary rigidity and consequent freedom from lost motion and with the minimum of wearing parts which are amply sufficient and yet simple and relatively economical to replace.

Third. To provide a universal joint with means wherewith to insure the proper lubrication of the wearing parts and to exclude all extraneous matter therefrom.

Fourth. To provide a universal joint relatively simple in construction and readily assembled or disassembled.

To fully accomplish the above objects with the minimum number of parts and simplicity of construction, it becomes necessary for various elements to serve dual purposes, as will hereinafter be fully explained. My invention, as herein shown and described is particularly adapted to small rolling mills, but is not intended to be so limited or defined, as it may be used in other connections where rotary motion is to be transmitted from one shaft to another.

My invention comprises a spindle with transverse end projections more or less rounded in form and having two parallel centrally recessed plane faces. The end projections are adapted to a sliding fit between a pair of slippers housed in a transverse cylindrical recess in the preferably enlarged coupling heads of the driving shaft and the driven shaft. This sliding pivot construction permits of the oscillation of the spindle and also provides, within the usual working limits, for the difference in alinement between the driving and driven shafts; *i. e.*, for a slight change in distance between the coupling heads of said shafts, the end projections of the spindle slide between the slippers to compensate for said change. At the same time the construction is such as to prevent lost motion and also provides for noiseless operation.

Couplng sleeves are provided which fit over the coupling heads of the driving shaft and driven shaft and act to maintain the assembly and also form convenient lubricant chambers. The last feature would be useless, however, if it were not for my improved lubricant retaining, dirt and dust excluding device.

This device comprises the use of the spindle as a strut or distance piece and a bow spring so arranged that a solid collar which is adjustably mounted on the preferably enlarged head of the spindle and has an outwardly extending lip or flange with a spherical inner face, is held in close sliding contact with the corresponding spherically faced outer edge of the coupling sleeve. The collar thus forms the male end and the coupling sleeve the female end of a ball and socket joint. The collar, thus acting as a yielding member, and the coupling sleeve jointly serve to center the spindle end in the coupling head and to form closed lubricant, dirt excluding, dust proof covers for the working members of the universal joint.

Having thus given a general description of my invention, I will now, in order to make the matter more clear, refer to the annexed sheet of drawings which forms part of this specification and in which like characters refer to like parts.

In the drawings I have shown but one end of the spindle as connected to the coupling head of a roll shaft. It is to be distinctly understood, however, that the construction at the other end of the spindle is similar to that shown except that the spindle would engage the coupling head of a driving shaft.

Figure 1 is a side elevation of my improved universal joint with the coupling sleeve and collar shown in section.

Fig. 2 is a side elevation with the roll neck partly cut away, showing the coupling head, coupling sleeve and collar in section, the joint being revolved a quarter of a turn from the position shown in Fig. 1.

Fig. 3 is a transverse section on the line III—III of Fig. 2 showing the arrangement of the slippers, the transverse end projections of the spindle and its coupling sleeve.

Fig. 4 is a side elevation, on a reduced scale, of the spindle partly broken away in the center, showing one of the collars in elevation and the other in section.

Referring now to the various characters of reference on the drawings:—1 represents a part of a roll, 2 the neck thereof, and 3 the preferably enlarged coupling head of the roll. The coupling head 3 contains the transverse cylindrical recess 4 which has in it the central grooves 5 adapted to receive a corresponding projection 6 on the back of the slippers 7. The spindle 8 has on each end the transverse end projection 9 having the two parallel, plane faces 10 which are adapted for sliding contact with and bearing against the plane face 11 of the slippers 7.

The coupling head 3 is provided with a close fitting coupling sleeve 12, the outer edge 13 of which is preferably spherical and adapted for a close sliding contact with the interior spherical face 14 of the outwardly extending lip or flange on the solid collar 15.

The transverse cylindrical recess 4 in the coupling head 3 has the channel 16 as clearance space for the bow spring 17. The bow spring 17 is held against the transverse end projection 9 of the spindle 8 by T-head bolts 18 whose heads bear against the bent up portions 19 of the bow spring 17 and whose shanks pass through the enlarged holes 20 in the spindle 8 and thence through the enlarged holes 21 in the collar 15 where they engage the spring locked adjusting nuts 22. The spring locked adjusting nuts 22 in connection with the bow spring 17, thus serve to insure the proper contact between the spherical outer edge 13 of the coupling sleeve 12 and the corresponding interior spherical face 14 of the outwardly extending lip or flange on the solid collar 15. By this means and the close sliding contact between the spherical faces on the coupling sleeve 12 and the collar 15, a lubricant retaining and dust and dirt excluding joint is assured.

As will be evident from the accompanying drawings, the internal diameter of the collars 15 is less than the width of the transverse end projections 9 of the spindle 8. Therefore in order to make the construction economical I propose to make the one piece or solid collars 15 first and then so place them that in the process of molding and casting the spindle 8, the collars 15 will come between the transverse end projections 9 of the spindle 8 as shown in Fig. 4.

It is thus evident that the universal joints I employ are of a telescoping type, the spindle ends forming the male part of the universal joint and the center of rotation of the coupling can thus be variable to suit varying angularities. It is not uncommon to employ dust proof lubricant retainers on fixed center couplings where telescoping shafts are employed, but where these are used they are not the elements which hold the coupling nuts in working relation, nor is the spindle or shaft thus employed.

Furthermore it is evident from the nature of the construction that my improved universal joint has the necessary flexibility for the work required and is at the same time of such rigid construction as to eliminate lost motion, all of which tends to noiseless operation. Also my universal joint is readily assembled or disassembled for inspection of the wearing parts which are amply sufficient and yet simple and relatively economical to replace. It is still further evident that with my improved device for retaining lubricant and excluding dirt, dust, etc., that a longer life is assured the joint and in particular to those parts which receive the greatest wear. All this is accomplished with the minimum number of parts and simplicity of construction by making several elements serve dual purposes as herein described.

Although I have described and illustrated my invention in considerable detail, I do not wish to be limited to the exact and specific details thereof as shown and described, but may use such modifications in, substitutions for, or equivalents thereof, as are embraced within the scope of my invention, or as pointed out in the claims.

Having thus described my invention, what I claim and desire to secure by Letters Patent is:—

1. In a universal joint, an endwise movable spindle, coupling sleeves, collars abutting said coupling sleeves and bow springs secured to said collars adapted to contact with said spindle, thereby holding said spindle in endwise equilibrium.

2. In a universal joint, an endwise movable spindle, coupling sleeves, collars abutting said coupling sleeves, and bow springs secured to said collars adapted to contact with said spindle, thereby maintaining sliding contact between said coupling sleeves and said collars, whereby said spindle is held in endwise equilibrium.

3. In a universal joint, an endwise movable spindle, coupling sleeves, collars abutting said coupling sleeves, and bow springs secured to said collars adapted to contact with said spindle, thereby causing said collars to slidably engage said coupling sleeves to hold said spindle in endwise equilibrium and to form with said coupling sleeves dust proof lubricant retaining covers for the working members of the universal joint.

4. In a universal joint, an endwise movable spindle, coupling sleeves, collars slidably mounted on said spindle and bow springs secured to said collars and adapted to contact with said spindle, whereby said collars slidably engage said coupling sleeves thereby holding said spindle in endwise equilibrium and forming with said coupling sleeves, dust proof lubricant retaining covers for the working members of the universal joint.

5. In a universal joint, a driving rotating element, a driven rotating element, an endwise movable spindle adapted to telescopically engage said rotating elements, coupling sleeves, collars abutting said coupling sleeves and bow springs adjustably secured to said collars and adapted to contact with said spindle, whereby the spindle is held in endwise equilibrium and the collars together with the coupling sleeves form dust proof, lubricant retaining covers for the working members of the universal joint.

6. In a universal joint, an endwise movable spindle adapted to slidably engage a bifurcated coupling head, a coupling sleeve for said coupling head, a collar slidably mounted on said spindle and abutting said coupling sleeve, a bow spring secured to said collar and adapted to contact with said spindle, thereby endwise centering said spindle and causing the collar to slidably engage the coupling sleeve and form therewith a dust proof, lubricant retaining cover for the working members of the universal joint.

7. In a universal joint, an endwise movable spindle adapted to slidably engage the bifurcated coupling heads of a driving rotating element, a driven rotating element adjustable thereto with reference to its axial alinement, coupling sleeves provided with spherically faced outer edges, collars slidably mounted on said spindle, bow springs adjustably secured to said collars and bearing against the ends of said spindle thereby endwise equilibrating said spindle and holding said collars in slidable contact with said coupling sleeves, thereby forming a dust proof, lubricant retaining coupling.

8. In a universal joint, an endwise movable spindle, a coupling sleeve with a spherically faced outer edge, a collar provided with an interior spherical face adapted to abut against the spherical outer face of said coupling sleeve, a bow spring adapted to bear against the end of said spindle thereby causing said collar to slidably engage said coupling sleeve, thus equilibrating said spindle and forming a dust proof, lubricant retaining coupling.

In witness whereof I hereunto affix my signature.

HARRY R. GEER.